United States Patent Office 3,270,291
Patented August 30, 1966

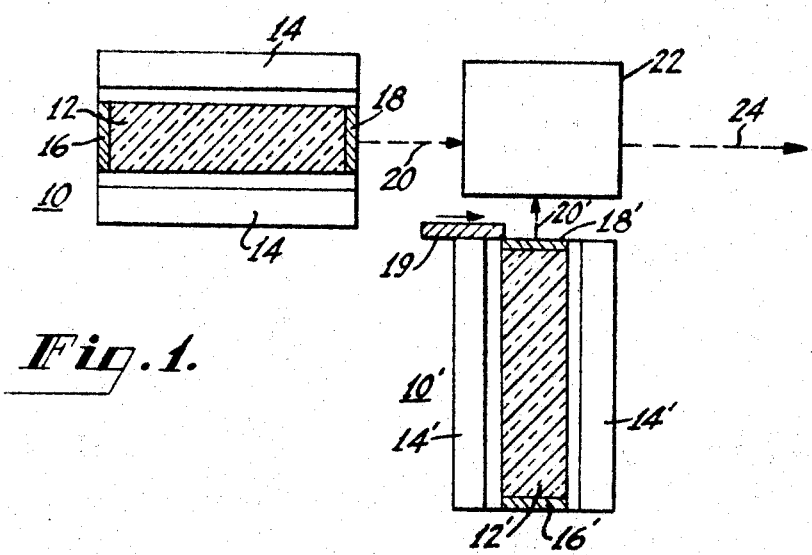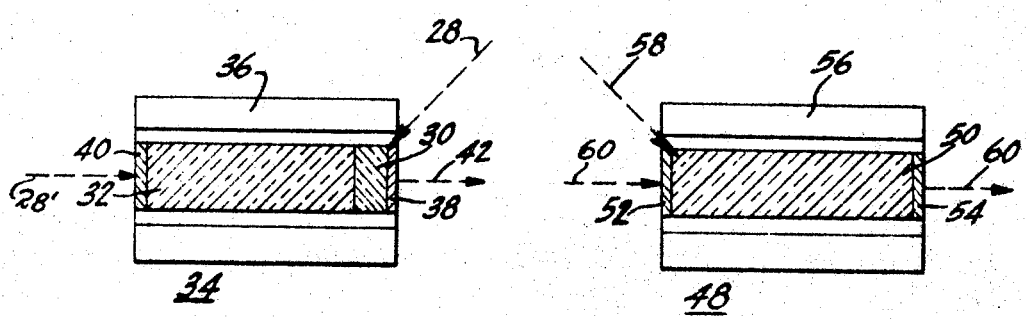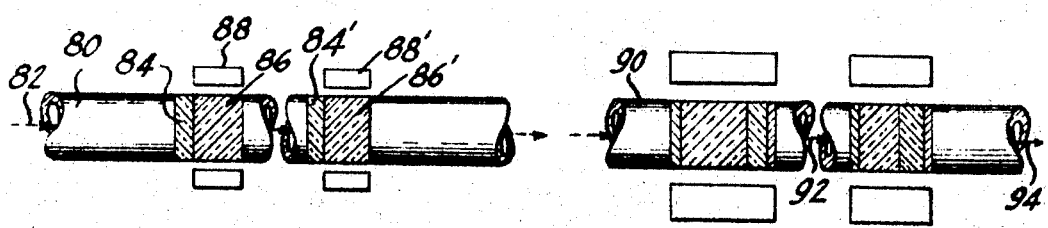

3,270,291
LASER CONTROL DEVICE USING A SATURABLE ABSORBER
Walter F. Kosonocky, Iselin, N.J., assignor to Radio Corporation of America, a corporation of Delaware
Filed Oct. 22, 1962, Ser. No. 231,919
9 Claims. (Cl. 331—94.5)

This invention relates to improved optical masers or lasers. In particular, this invention relates to an improved laser system including novel light processing and/or control means.

The term laser is a name used to refer to a device which provides "light amplification by stimulated emission of radiation." By light is meant electromagnetic energy in the infrared frequency as well as visible spectrum. The laser device is most commonly used as a source of coherent light.

In general, a laser includes:
(1) an active material that will produce net stimulated emission of radiation, and
(2) an excitation source that pumps power into the active material.

The active material of a laser has two states which are separated in energy by an amount corresponding to a characteristic output frequency. The active lasing material is characterized by the properties that (1) its atomic particles may be excited into the higher of the two energy levels by means of the excitation source and thus an inverted population condition may be produced, and (2) when the atomic particles return to the lower energy level, as result of stimulation by electromagnetic fields, the active material then amplifies the incident electromagnetic field. The emitted light is such that, within the active material, incident photons stimulate the ions to emit photons in phase with the incident photons. When such active material is placed in a resonant structure, the electromagnetic field in one or more modes of the structure will build up to high intensities in the form of coherent light.

When one attempts to utilize a coherent light beam for many applications, it is desirable to have one or more circuit components that respond only to light intensities above a predetermined threshold level. In other words, it is desirable to prevent the coherent light wave from passing through a particular element when the intensity of the light wave striking the element is below a predetermined threshold level, and to pass the coherent light wave when its intensity is above this predetermined threshold level.

In other systems using a coherent light beam, it is desirable to amplify the light beam for particular uses. For example, assuming that a coherent light beam is to be sent through a transmission line, it is desirable to amplify the beam, at a number of locations along the line, to replace any energy lost by the transmission of the light through the line.

In still other systems, a combination of the two functions described above is desirable. In other words it is desirable to have a threshold amplifier wherein light levels above a threshold level are amplified and light levels below this threshold level are absorbed.

It is therefore an object of this invention to provide a new and novel laser device and system.

It is another object of this invention to provide an improved light device and system characterized in the fact that substantial light transmission occurs through the system only when the input energy level is above a predetermined level.

It is a still further object of this invention to provide an improved laser apparatus having a novel means therein characterized in that light signals above a selected threshold level are amplified while light below this level is absorbed.

These and other objects are accomplished in accordance with this invention by providing a saturable absorber positioned in the path of a coherent light beam. The saturable absorber is such that light below a predetermined threshold level is absorbed by the saturable absorber, while radiations greater than this threshold level are passed through the saturable absorber. The light which is absorbed may be selected to include any incoherent radiation and/or noise radiation. When amplification is desired, the light path may include a saturable absorber and an active lasing material. The active lasing material is positioned adjacent to a pumping source, and may be positioned in a resonant cavity, so that amplification will occur for a light signal greater than the threshold level, while below this threshold level the light is attenuated. The saturable absorber may be made of a host material including absorbing ions, when only the absorb-threshold function is desired. But to achieve an absorb-threshold-gain characteristic, a saturable absorber material and emissive material, are included in the laser structure.

The relationship between the emissive material and the saturable absorber material is such that the strength of interaction of the absorbing particles with an electromagnetic wave of the frequency of emission of said emissive material is greater than the strength of interaction of the emissive particles with the same wave. This condition is met where the product of the square of the induced electric dipole moment and the transverse relaxation time of the absorbing particles at the emission frequency is greater than that of the emissive particles for the same frequency.

The invention will be described in greater detail by reference to the accompanying drawings wherein:

FIG. 1 is a partially schematic elevational view of a laser apparatus and absorber used to illustrate some of the principles of the present invention;

FIGS. 2 and 3 are elevational views of embodiments of this invention wherein the saturable absorber is positioned within the resonant cavity of a laser and amplified threshold signal is produced;

FIG. 4 is an elevational view of another embodiment of this invention used in a light transmission line; and, FIG. 5 is an elevational view of an embodiment of this invention illustrating cascaded resonant structures.

A description of the response of saturable absorbers to laser signals in general will be given with reference to FIG. 1. A more detailed description is given in the accompanying appendix. FIG. 1 shows two laser devices 10 and 10' both of which are for producing beams of coherent radiation. By coherent radiation is meant the stimulated emission radiation obtainable from a known laser device. Since devices 10 and 10' are similar, only one will be described in detail. The laser device 10 includes an active lasing material 12, a pumping source 14, and a pair of optical reflecting surfaces 16 and 18 which define the opposite ends of a resonant body or resonant cavity.

The active lasing material 12 may comprise any known substance which has two energy states which are separated by an amount corresponding to a characteristic frequency of the active lasing material 12. The active lasing material 12 has the property of being excitable into an inverted population density condition, i.e. an excess population can be established in the upper, or one of the upper, energy states. The active material 12 emits substantially coherent radiation as the atomic particles return from the higher energy level to a lower energy level. The active lasing material 12 may be any of the known gases or solids which are known to exhibit the lasing action. A specific example of an active lasing material 12 is calcium fluoride doped with divalent samarium.

The pumping source 14 may comprise any source of energy which is capable of exciting the molecules or ions in the active lasing material 12 from a lower energy level into one of the desired higher energy levels. In other words, the pumping source 14 is a source of energy which is capable of establishing the inverted population density condition in the active lasing material 12. Examples of such pumping sources are a means for providing a radio frequency field, a xenon flash tube, or other suitable known types of energy sources.

The active material 12 produces coherent radiation and is usually positioned in a resonant cavity. Thus, adjacent to the ends of the active lasing material 12 are two light reflecting devices or mirrors 16 and 18. At least a portion of one of the mirrors, e.g. light reflecting device 18, is made so as to be partially transparent so that an output beam 20 of coherent light may be obtained from the laser 10. The light reflecting devices 16 and 18 are precisely oriented so that one or more modes will exist between the light reflecting devices at frequencies for which the spacing therebetween is an integral number of half wavelengths. The light reflecting devices may be formed of a highly light reflecting material such as silver, or multiple layer structures such as the interference type light reflectors.

The operation of both of the devices 10 and 10' is conventional in that the pumping sources 14 and 14' energize the active lasing materials 12 and 12' to establish the inverted population condition in the active lasing materials. As the atomic particles return to a lower energy level, coherent light is produced which oscillates within the resonant cavities. The light may be visible or invisible such as, for example, infrared. The light passes through the partially transparent reflectors 18 and 18' as two coherent light beams 20 and 20'.

Positioned in the path of both of the coherent light beams 20 and 20' is a saturable absorber 22. The light transmission through the saturable absorber 22 increases at a greater rate as the energy level input into the absorber increases. The saturable absorber 22 is designed so as to absorb a large percentage of light of a magnitude provided by either one of the coherent light beams 20 or 20' alone, but to pass substantially all of the coherent light beam 20 when both of the beams 20 and 20' strike the absorber 22. In other words, the saturable absorber 22 is such that substantially all light energy striking the absorber 22 is absorbed when the light is not of a magnitude greater than that of the light beam 20. Also, the saturable absorber 22 is such that, when both the coherent light beams 20 and 20' land on the absorber, at substantially at the same time, then the beams 20 and 20' saturate the absorber, permitting the beam 20 to pass through the absorber 22 substantially unattenuated as an output coherent light beam 24.

When both of the light beams 20 and 20' land on the absorber 22, some of the light beam 20' will also pass through the saturable absorber material 22. However, due to the directional properties of light, the beam 20' does not form any part of the output beam 24. Rather, the light beam 20' controls the transmission of the light beam 20. The light beam 20' may be switched by a variable aperture device 19. The amount of control provided by the beam 20' depends upon the intensity of the beam 20', which, for a strong effect, should be substantially larger than that of the beam 20.

The signal controlled light beam 24, is a coherent light beam of substantially the same frequency, and other characteristics as the input coherent light beam 20. The signal controlled coherent light beam 24 may be used to energize any known system or light receiver, e.g. a signal system or a computer.

It should be understood that the switching light 20' may be a coherent light beam, or may be an incoherent light beam of the proper frequency and magnitude to provide saturation of the saturable absorber 22.

The following explanations presuppose the conditions that (1) the recovery time of the resonant particles of the system is long as compared to the transverse relaxation time and (2) the signal light levels are low enough so that the saturation conditions are approached in times that are also long as compared to the transverse relaxation time. By recovery time is meant the average time that elapses between when a resonant particle is excited from the equilibrium state until it returns to the equilibrium state when no signal is present. By transverse relaxation time is meant the average time that the resonant particles can continue to interact with the electromagnetic wave before this interaction is interrupted by some process which, by itself, does not produce a population change.

The absorb-transmit action of the absorber 22 is achieved by including a number of ions, in a host material of the saturable absorber 22, of the type which will absorb light and as they absorb light will be excited into a particular state. The absorber ions have an absorption band at, or overlapping, the emission frequency, or spectrum, of the laser beams 20 and 20'.

Saturation of the absorber is approached exponentially at a rate dependent upon the material parameters and the magnitude of the applied signal. In the steady state saturation condition somewhat less than half the absorbing particles are in the excited state. The degree to which the state of one half the particles excited is approached also depends upon the material parameters and the strength of the applied signal. (See Equation 4, column 9 of the appendix.)

The strength of interaction between the material, and the light beam, determined the intensity of the light that is necessary to approach the condition when the saturable absorber becomes almost transparent. The length of the saturable absorber and the density of the saturable absorber ions, determines its effect on light beam 20. Thus, the density of the available absorber ions determines the level of the light which can be controlled by the saturable absorber.

When the absorber ions are excited, they remain in the excited condition for a predetermined length of time, then return to the unexcited condition, i.e. the recovery time. Assuming that all of the absorber ions have been excited, then the recovery time establishes the rate at which separate pulses of light from the laser 10 may be controlled by pulses from the second laser 10'.

If the laser 10' is not on, and if the pulse repetition rate of the laser 10 is faster than the recovery time of the absorbing ions, then some of the energy from the first pulse will be "stored" when the second pulse arrives. This "stored" energy can eventually build up until the absorber reaches some steady state saturation at which point the input signal 20 will suffer less attenuation as it passes through the absorber 22 than it did prior to saturation.

Due to the recovery time of the ions of the saturable absorber, and assuming pulse operation, the signal pulse 20 need not strike the saturable absorber 22 at exactly the same time as the control light 20'. For example, when saturation has been reached, the saturation condition may decay exponentially when the control pulse 20' is removed. This temporary storage of the transparency permits the application of the signal pulse subsequent to the control pulse. For example, assuming complete saturation, i.e. 100% transparency, if 1/10 of the recovery time has elapsed when the signal pulse arrives, the saturable absorber will be approximately 90% transparent.

In the embodiment shown in FIG. 1, light from laser 10' controls the beam of light 24 from laser 10. This controlled light 24 may be used in any desired system such as a signaling, communication or computer system or other circuit. The control exhibited is that of absorb-pass.

Any known material, or materials, which have the characteristics previously described may be used as a saturable absorber 22. As a general class of materials, the divalent rare earths in a suitable host material are believed to be most suitable for providing the above described properties. However, other materials may be used. For example, the above effects can be demonstrated where the laser 10 is a ruby laser producing pulses of light at a repetition rate of 100 c.p.s., at a frequency of 6943 A. and at a magnitude of 1 joule/pulse, then a suitable saturable absorber would be a block 2 cm. long and 1 x 1 cm. square of a host material of aluminum oxide ($Al_2O_3$) which would control the light beam 20. A concentration of 1% chromium ($C_r^{3+}$) ions in the host material $Al_2O_3$ would be suitable.

FIG. 2 shows an embodiment of this invention which provides an "absorb-threshold-gain" characteristic. The absorb-threshold-gain action is achieved by combining the properties of a saturable absorber with those of a laser emitting material. This is done by using two different types of ions in the laser cavity as will be explained.

In FIG. 2, a saturable absorber 30 and an active lasing material 32 are both positioned in a laser resonant cavity formed by light reflectors 38 and 40. Positioned adjacent to the active material 32 is a pumping source 36. The active material 32, the resonant cavity and the pumping source may be similar to those previously described.

In this embodiment the absorbing ions in the saturable absorber 30, should have a sufficiently low absorption in the laser ion pumping bands, to permit establishing the population inversion condition in the laser emission system and to prevent the saturation condition from being established by the pump source. Also, the absorbing ions of the saturable absorber should absorb at all wavelengths at which the emissive ions of the active lasing material 32 can oscillate.

In order to achieve absorb-threshold-gain characteristics, the following relationship between the absorber and emitter material should be established. The relationship between the emissive material and the saturable absorber material is such that the strength of interaction of the absorbing particles with an electromagnetic wave of the frequency of emission of said emissive material is greater than the strength of interaction of the emissive particles with the same wave. This condition is met where the product of the square of the induced electric dipole moment and the transverse relaxation time of the absorbing particles at the emission frequency is greater than that of the emissive particles for the same frequency. In addition, the number of emitter particles should be significantly greater than the number of absorber particles. The above conditions may be expressed as follows:

(1) $\quad N_a < N_e$ (2) $\quad N_a B_a > N_e B_e$ where, $N_a$ is the number of particles in the lower state of the absorber just prior to the application of a signal, $N_e$ is the number of particles in the upper state of the emitter just prior to the application of a signal, $B_a$ is the interaction coefficient of the absorber material and represents the strength of interaction of the absorber particles with an electromagnetic wave at the emission frequency of the emissive material. (The interaction coefficient is more precisely defined in (6) of the appendix.)

$B_e$ is the interaction coefficient for the emitter material.

From conditions (1) and (2) above it is clear that, $$B_a > B_e \qquad (3)$$

This condition (3) may also be expressed as follows, $$(p_e)^2 T_{e2} < (p_a)^2 T_{a2} \qquad (4)$$

where, $p_e$ and $P_a$ are the induced electric dipole moments of the emitter particles and absorber particles respectively, and $T_{e2}$ and $T_{a2}$ are the transverse relaxation times of the emitter particles and absorber particles respectively.

For a more detailed explanation of these conditions see the appendix.

Thus, light from the active laser material 32 is absorbed by the saturable absorber 30 unless a control light 28 saturates the absorber ions in the saturable absorber 30. When the absorbing ions are saturated, the laser cavity becomes effectively transparent to the lasing modes and lasing action occurs to produce an output coherent light beam 42.

The light beam 28 does not produce high Q modes in the resonant cavity because the beam 28 lands only on the absorber 30. The beam 28 may be considered as a control or switching beam. Such a control light may be an incoherent light beam of sufficient intensity, or may be a coherent light beam from another laser, such as laser 10' of FIG. 1. The control light may also be a pumping light. This can be done in two ways. The saturable absorber may have absorption bands in the pump frequencies and can be controlled by a separate pump source. Or the pump 36, if of high intensity, may produce a sufficiently high inverted population density of the emissive ions so that their fluorescence will saturate the saturable absorber ions.

When the light beam 28, however, does produce high Q modes, e.g. if the beam 28 is directed into the active material 32 and into the absorber 30, and substantially perpendicular to the reflectors 40 and 38 as shown at 28' in FIG. 2, then the beam 28' should be coherent. The coherent beam will, depending upon its intensity, be absorbed or amplified. Thus, threshold of amplification of the same signal is produced when a coherent beam 28 is directed into the laser cavity to produce a high Q mode.

The materials used in the embodiment shown in FIG. 2 may be similar to those previously described.

The above discussion has assumed that the control light 28 is a constant source of light. If the control light is a pulsed light of long duration, high magnitude, and high repetition rate, the same situation exists, i.e. the absorber becomes saturated and remains in the saturated state.

Assuming the control light 28 is pulsed at a repetition rate lower than the recovery time of the ions in the absorber, then, depending upon the relationship between the recovery time of the emitter ions and the recovery time of the absorber ions, two conditions exist. Assuming the emitter ion have a shorter recovery time than the recovery time of the absorber ions, then a constant output signal would be obtained. In other words, the oscillations would be triggered by the input pulse and would be self-sustained in the laser cavity. Assuming the emitter ions have a longer recovery time than the recovery time of the absorber ions, then the duration of control pulse with respect to the time required for the emitter ions to saturate must be considered. When the control pulse is short, as compared to the emitter ion saturation time, then a single burst of output light would be produced by the device 34 for each control pulse. When the control pulse is long, as compared to the emitter ion saturation time, then a series of bursts (which may degenerate into a steady state output depending upon the emitter material) of output signals will be produced while the control pulse is on.

FIG. 3 shows an embodiment of this invention wherein the saturable absorber ions and the active lasing ions are mixed in a common host material 50. The host material 50 is positioned in a resonant cavity formed by reflecting surfaces 52 and 54. If any undesirable direct coupling between the excited emitter ions and the absorber ions occurs, in the absence of an input signals, the emitter ions and the absorber ions should be separately grouped in the host material.

A pumping source 56 is positioned adjacent to the host material 50 which includes the active lasing ions. A control beam 58 may saturate the absorber ions and increase the gain of the system to the point required for oscillations. The beam 58 may be used to saturate the absorber ions and permit amplification of an input signal 60 such that the intensity of the output beam 60' is greater than that of the input beam 60.

The conditions for the absorbed-threshold-gain characteristic are the same for the embodiment of FIG. 3 as they are for the embodiment of FIG. 2.

Any known materials may be used in the combination absorber-emitter 50 which have the characteristics previously described. An example of a class of materials which are believed to be useful, the trivalent rare earths may be used as the emitter ions, and divalent rare earths as the absorber ions in a host material. However, these are not the only suitable materials. Examples may be 1% neodymium ($Nd^{3+}$) emitter ions and 1% erbium ($Er^{2+}$) or 1% vanadium ($V^{3+}$) absorber ions in a suitable host material. A suitable host for the vanadium is for example calcium tungstate ($CaWo_4$).

The resonant cavity, formed by reflecting surfaces 52 and 54 may be omitted. Under such conditions, the pumping source 56 would still provide the inverted population condition and the emissive ions would still produce a coherent light beam 60. The only difference in result would be that the output light beam 60 would be of smaller magnitude than when a resonant cavity is used, assuming that the input light was not of sufficient magnitude to saturate completely the emissive ions. When the resonant cavity is omitted, the length of the body 50 must be increased to obtain high gains, assuming the same ion concentration. Thus, this structure can be used as a distributed pulse amplifier.

FIG. 4 shows an embodiment of this invention including a distributed pulse amplifier used as at least a part of a light transmission line 80. In this embodiment a light 82 is to be transmitted to some remote point. When the light 82 strikes a saturable absorber 84, the low amplitude part of the light beam 82 is absorbed. The absorber 84 is preferably designed so that this low amplitude part includes any noise that is generated in the transmission line. When the beam 82 is of sufficient magnitude to pass through the absorber 84, it will be substantially noise free, assuming that the noise arrives at a different time than the signal, and will strike an amplifier section 86 where it is amplified by a pumping source 88. The process may be repeated any desired number of times as illustrated.

The entire transmission line may include absorber and emissive ions, for example, optical fibers with appropriate dopants. The threshold level is selected to be above the noise level in the transmission line, and the signal level is substantially above the threshold level. Any signal above threshold will be applied toward the saturation value.

When a large pulse passes through a transmission line, the recovery time effectively follows the pulse. In other words, after a large pulse has saturated the absorber ions and the emitter ions, and the absorber ions recover before the emitter ions, there is an effective region following behind each pulse which is an absorptive region that attenuates any reflection. Thus, a reflection tending to travel in the opposite direction is attenuated below threshold. Because of this, the absorber ions are preferably selected to have a shorter recovery time than the emitter ions when used in a transmission line. The line may be designed to have a unilateral direction by increasing the threshold for amplification, and the maximum signal, in a given direction. If it is desired to reach the saturation value at each amplifier, the light emitting section 86 of FIG. 4 may be enclosed in a resonant cavity. Also, the absorber ions and the emissive ions may be mixed in a common host material, as described in connection with FIG. 3, and the combination placed within the pumping source.

FIG. 5 shows a section of a light transmission line 90 having a pair of devices 26 and 26'. The devices 26 and 26' are similar to those described in connection with FIG. 2. In the embodiment of FIG. 5, the preferred operation is that wherein the recovery time of the absorber ions is faster than that of the emitter ions as previously discussed. Briefly, light in the transmission line 90 is passed into the resonant structure and is absorbed, or amplified, depending upon its magnitude. After the passage of a pulse, the structure is absorptive because of the recovery times involved. As the light is amplified and exceeds the threshold, it becomes a coherent beam 92 which is then passed into another portion of the transmission line 90 to a cascaded absorbing-amplifying device 26'. Any number of devices 26 may be used.

The embodiment shown in FIG. 5 differs from that shown in FIG. 4 in that, due to the presence of the resonant cavity, oscillations will develop which will tend to be directed into the transmission line in both directions. Due to the presence of the absorber ions, and the relaxation times involved, light may be transmitted in either direction, but only one direction at a time. For example, assume that device 26' is producing a beam 94 in the direction shown, any backward part of this beam will be absorbed by device 26 because its emissive ions have previously been saturated and it is now in the recovery process. Thus, in the example, any backward part of the beam is then absorbed. This results in a unidirectional propagation of pulse. When a truly unilateral device is desired, the threshold of amplification and gains of the individual sections can be graded in a predetermined direction along the line.

The amplification of the coherent light beam is such as to require lower pump power as compared to FIG. 4 because of the presence of the resonant structures. Also, the resonant structure inherently produces a slow wave structure since each pulse is "delayed" in its transit along the line as it resonates in each cavity. Thus, the same amplification may be developed in this embodiment, as compared to FIG. 4, while using a substantially shorter section of light amplifier.

The embodiment shown in FIG. 5 may also be used as a multicontrol transmission gate by cascading several amplifying stages, each of which is controlled by a separate control light similar to control light 28 in FIG. 2.

It should be understood that a cascaded system of structures 48 of the type described in connection with FIG. 3, may also be used and operation similar to that described in connection with FIG. 5 will be obtained.

Appendix

An idealized relationship for the change of population of emitter or absorber ions, in response to an applied electromagnetic wave is given in relationship (1) below. The amplitude of the electromagnetic wave is assumed to be constant.

Consider a uniform medium containing a given concentration of 2-state atomic particles or ions N (ions per unit of volume). These particles will have two possible energy states $E_1$ and $E_2$ and a resonant frequency $\nu_0$ equal to $$\nu_0 = \frac{E_2 - E_1}{h}$$

where $h$ is the Planck's constant ($h = 6.62 \cdot 10^{-27}$ erg-sec.). The concentrations of the particles in the lower and the upper states will be designated as $n_1$ and $n_2$.

Assuming that originally the population is in the lower state, i.e. $n_1 = N$ and $n_2 = 0$, and then it is subjected to a step of monochromatic light of a frequency corresponding to the resonant frequency of the system. In terms of electric field intensity E, it means that, $$E = E_1 \sin 2\pi\nu_0 t \quad \text{for } t > 0$$
$$E = 0 \quad \text{for } t < 0$$

Then, the concentration of the upper state $n_2$ can be expressed as a function of time by the following equation:

$$n_2(t) = \frac{N\Omega^2 T_2 T_1}{2(1+\Omega^2 T_2 T_1)}\left[1-\exp\left(-\frac{t}{2T_e}\right)\left(\cos h\tfrac{1}{2}Rt + \frac{1}{RT_e}\sin h\tfrac{1}{2}Rt\right)\right] \quad (1)$$

where $$\Omega^2 = \left(\frac{pE}{\hbar}\right)^2$$

$$R = \sqrt{\left(\frac{1}{T_2}-\frac{1}{T_1}\right)^2 - (2\Omega)^2}$$

$$\frac{1}{T_e} = \frac{1}{T_1} + \frac{1}{T_2}$$

The parameters of the ions are defined as, $T_1 \equiv$ Recovery time in sec.
$T_2 \equiv$ Transverse relaxation time in sec.
$p \equiv$ Induced electric dipole moment in e.s.u.
$E \equiv$ Electric field intensity in stat. volts/cm.
$\hbar \equiv 1.05 \times 10^{-27}$ erg. sec.

Recovery time $T_1$ corresponds to the spontaneous radiative or non-radiative transition from energy state $E_2$ to energy state $E_1$. The rate of this transition is $n_2/T_1$.

The transverse relaxation time $T_2$ is the average time during which an ion can interact with the electromagnetic wave before it is dephased or interrupted by some (transverse) process which, however, does not lead per se to a change of the density of the excited state $n_2$, or in other words does not result in a change of energy of the system.

The Equation 1 was derived for the assumption that each ion interacts independently with the applied field and that the amplitude of the applied field is constant and independent of the transitions of the ions.

When the transverse relaxation time is substantially smaller than the recovery time, and the electromagnetic pulse is of low intensity; i.e.

For $T_2 \ll T_1$ and $\left(\frac{1}{T_2}\right)^2 \ll 2\Omega^2$

Then $$R \doteq \left(\frac{1}{T_2}-\frac{1}{T_1}\right) - 2\Omega^2 T_2$$

and Equation 1 can be reduced to $$n_2(t) = \frac{N\Omega^2 T_2 T_1}{2(1+\Omega^2 T_2 T_1)}\left[1-\exp\left(-\frac{t}{T_1}-\Omega^2 T_2 t\right)\right] \quad (4)$$

Thus, the commonly used phenomenological rate equation is shown below.

$$\frac{dn_2}{dt} = -\frac{n_2}{T_1} - (2n_2 - N)\frac{BP}{2} \quad (5)$$

where $$B = \frac{n 8\pi p^2 T_2}{c\hbar^2} \quad (6)$$

The power flux density $P$ in ergs/cm.$^2$/sec. can be expressed as $$P = \frac{cE^2}{n 8\pi} \quad (7)$$

The change of the energy of a pulse whose duration $T$, satisfies, $T_2 \ll T \ll T_1$ can be stated as $$\frac{\partial W}{\partial x} = \frac{-h\nu_0 N}{2}(-\exp.(-BW)) \quad (8)$$

where $$W = \int_0^T P\, dt$$

If the duration of the electromagnetic wave is much shorter than the transverse relaxation time, then;

$$n_2(t) = \frac{N}{2}\left(1 - \cos\frac{pE}{\hbar}t\right) \quad (9)$$

For small intensities and short times, i.e.

$$\frac{pE}{\hbar}t \ll 1$$

$$n_2(t) = \frac{N}{4}\left(\frac{pEt}{\hbar}\right)^2$$

Note that for pulse duration $T$ when $$T\frac{pE}{\hbar} = \pi n_2(T) = N$$

This is usually referred to as a 180° pulse. A passage of 180° pulse through the resonant ions leaves behind inverted population, i.e. $n_2(T) = n_1(0)$ and $n_1(T) = n_2(0)$. In general the change of energy during propagation can be expressed as $$\frac{\partial W}{\partial x} = \frac{-h\nu_0 N}{2}\left[1 - \cos\left(\frac{pET}{\hbar}\right)\right] \quad (10)$$

for a pulse with a given instantaneous electric field intensity $E$ and duration $T$. Of course, a rectangular pulse has been assumed.

For low intensity pulse, when $$\frac{pET}{\hbar} \ll 1$$

the Equation 10 will be reduced to $$\frac{\partial W}{\partial x} = \frac{-N\nu_0 \pi^2 (pET)^2}{\hbar} \quad (11)$$

However, for the 180° pulse case the change of energy is simply $$\frac{\partial W}{\partial x} = -h\nu_0 N \quad (12)$$

Equations 8, 10, 11, and 12 above also apply to an emitter material provided the minus signs are dropped from the equations.

With the developed background, propagation of pulses of electromagnetic waves in an active transmission medium will be considered. The active transmission medium will contain certain concentrations of active, pumped, emissive ions, $N_e$, and of resonant, absorptive ions, $N_a$. The medium will have in addition constant losses designated by a loss constant $\alpha_0$, i.e., $$\left.\frac{\partial W}{\partial x}\right]_{\alpha_0} = -\alpha_0 W$$

where $W$ is the energy of the pulse. The ideal saturable absorber ions are defined as two-energy-state particles with population densities $n_{a1}$ and $n_{a2}$ ($n_{a1} + n_{a2} = n_a$) in the states of energy $E_1$ and $E_2$ and with resonant frequency $\nu_0 = (E_2 - E_1)/h$. Their interaction with the incident wave, as outlined in the previous section, can be described by the induced electric dipole moment $p_a$, interaction time $T_{a2}$, and recovery time $T_{a1}$. At thermal equilibrium the lower energy state of these ions is assumed completely occupied, i.e., $n_{a1} = N_a$ and $n_{a2} = 0$.

The ideal emitter ions are similarly defined as two-energy-state particles with populations $n_{e1}$ and $n_{e2}$, the same resonant frequency $\nu_0 = (E_2 - E_1)/h$, and $$n_{e1} + n_{e2} = N_e$$

Their interaction with the incident wave is also describable by an induced electric dipole moment $p_e$, interaction time $T_{e2}$, and recovery time $T_{e1}$. However, at the equilibrium condition in the absence of an applied signal, the upper energy state is completely occupied, i.e., $n_{e1} = 0$ and $n_{e2} = N_e$. (The effective concentration of the ideal emitter ions $N_e$ would be related to the actual concentration of such emissive ions, longitudinal relaxation times, and the pump intensity.) The emitter recovery time $T_{e1}$ is determined by the pumping rate in combination with the actual longitudinal relaxation times.

If it can be assumed that the pulse duration is much shorter than the recovery times $T_1$, i.e., $T_1 \gg T \gg T_2$, then the description of the change of pulse energy per unit length depends only on the energy of the pulse and is independent of its shape. For $n_{e1}(t=0)=0$ and $$n_{a2}(t=0)=N_a$$

$$\frac{\partial W}{\partial x} = \frac{h\nu_0 N_e}{2}(1-\exp.(-B_e W))$$
$$- \frac{h\nu_0 N_a}{2}(1-\exp.(-B_a W)).$$

Let us see how the operation of the previously analyzed active transmission medium should be modified for pulses of very short duration, $T \ll T_2$.
Following the Equation 10

$$\frac{\partial W}{\partial x} = \frac{h\nu_0 Ne}{2}\left[1-\cos\left(\frac{p_e ET}{\hbar}\right)\right] -$$
$$\frac{h\nu_0 Na}{2}\left[1-\cos\left(\frac{p_a ET}{\hbar}\right)\right] - \alpha_0 W \quad (14)$$

For the condition when $$\frac{p_e ET}{\hbar} \ll 1 \text{ and } \frac{p_a ET}{\hbar} \ll 1$$

$$\frac{\partial W}{\partial x} = \frac{\nu_0 \pi^2 Ne(p_e ET)^2}{\hbar} - \frac{\nu_0 \pi^2 Na(p_a ET)^2}{\hbar} - \alpha_0 W \quad (15)$$

When $$N_e p_e^2 < N_a p_a^2 \frac{\partial W}{\partial x} < 0$$

and the transmission medium is absorptive. If $p_a > p_{e1}$ maximum absorptive will be reached when the pulse intensity and duration will correspond to the 180° pulse for the saturable absorber ions, $ET = h/2p_a$. For pulses with higher ET product the effect by the emissive ions will start to dominate. The threshold for amplification will be reached when $\partial W/\partial x = 0$ for Equation 14. For further increase of the ET product, the transmission medium will amplify the pulses.

If the concentration of the saturable, resonant, absorber ions is chosen considerably lower than of the emissive ions, for example $N_a < .1N_e$, the effect of the resonant absorber ions could be neglected for large signals. Then it is expected that for an infinite transmission medium a 180° pulse for the emissive ions will be formed. This pulse should reach a steady state condition of propagation with no additional changes in amplitude or shape. When $$\frac{\partial W}{\partial x} = h\nu_0 N_e - \alpha_0 W = 0$$

or $$W_{se} = \frac{h\nu_0 Ne}{\alpha_0} \quad (16)$$

Let us first re-examine the general desirable relations between the parameters of the emissive ions and the ions of the saturable absorber that produce the threshold for amplification. A long or closed loop active transmission line should be stable or absorptive for small signal levels. For the situation discussed previously, which implies that pulses with duration that are long as compared to the transverse relaxation time will saturate both ions, $T \gg T_2$, $$\frac{\partial W}{\partial x} = \frac{h\nu_{00} N_e B_a W}{2} - \frac{h\nu_0 N_a B_a W}{2} - \alpha_0 W \quad (17)$$

for $B_e W \ll 1$ and $B_a W \ll 1$
Ignoring the constant loss term, the condition for the $$\frac{\partial W}{\partial x} < 0$$

is that $$N_e B_e < N_a B_a \quad (18)$$

But $N_e > N_a$ is required to produce gain for pulses with energy above the threshold for amplification. Or, for example, when the pulse saturates both ions $$\frac{\partial W}{\partial x} = \frac{h\nu_0 N_e}{2} - \frac{h\nu_0 N_a}{2} - \alpha_0 W \quad (19)$$

$$\frac{\partial W}{\partial x} > 0 \text{ requires } N_e N_a$$

This means that $$B_e < B_a \quad (20)$$

must hold. This condition can be expressed as be expressed as $$(p_e)^2 T_{e2} < (p_a)^2 T_{a2} \quad (21)$$

or $$\frac{(p_e)^2}{\Delta\nu_e} < \frac{(p_a)^2}{\Delta\nu_a}$$

Where the homogeneously broadened line widths are $$\nu_e = \frac{1}{\pi T_{e2}} \text{ and } \nu_a = \frac{1}{\pi T_{a2}}$$

For the other extreme condition when the pulse durations are much shorter than the transverse relaxation time. Accordingly for very low intensities, i.e.

$$\frac{p_e ET}{\hbar} \ll 1 \text{ and } \frac{p_a ET}{\hbar} \ll 1$$

$$\frac{\partial W}{\partial x} = \frac{\nu_0 \pi^2 N_e (p_e ET)^2}{\hbar} - \frac{\nu_0 \pi^2 N_a (p_a ET)^2}{\hbar} - \alpha_0 W$$

Again, ignoring the constant loss term, the medium will be absorptive when $$N_e p_e^2 < N_a p_a^2$$

To obtain the threshold for amplification in this medium the intensity of the 180° pulse for the saturable absorber ions must be lower than that for the emissive ions. This means that $$p_e < p_a$$

must hold. Further, to secure the static, low frequency, or long pulse stability for long or closed loop lines, the condition of $N_e B_e < N_a B_a$ must hold for both limiting cases.

To secure the condition that the threshold for amplification is monotonically decreasing towards the final value during the recovery of the active transmission medium following a pulse, the recovery time of the saturable absorber ions must be shorter than the recovery time of the emissive ions. This means that $T_{e1} > T_{a1}$ is a general requirement.

The above appendix is directed to a mathematical discussion of a transmission line of the type including emissive ions and absorbing ions mixed together, and with a length long as compared to the pulse duration. This structure was described in connection with FIG. 4 in columns 7 and 8 of the specification. The mathematical description of a slow wave structure, described in column 8, will be essentially analogous.

The above derived material specifications are also applicable for the establishment of the conditions between the emissive and absorptive ions to obtain the threshold for amplification.

What is claimed is:
1. In combination
   (a) a cavity resonant at a given frequency,
   (b) a material positioned within said cavity for absorbing energy at said frequency,
   (c) a material positioned within said cavity for emitting energy at said frequency; means for establishing a population inversion, corresponding to said frequency, in said second mentioned material for producing said emitted energy, the quantity of said second mentioned material in its excited state being such that the maximum population inversion, corresponding to said frequency, of said second mentioned material is greater than the population of the lower of the two states involved in absorption by said first mentioned material, (d) said materials being positioned such that energy sustained by said cavity passes through both materials and such that said first mentioned material can absorb energy emitted by said second mentioned material, and (e) the characteristics of said first and second mentioned materials being such that the strength of interaction between particles of said first mentioned material and an electromagnetic wave at said frequency is greater than the strength of interaction between particles of said second mentioned material and the same wave.

2. The combination as claimed in claim 1 and further including means for supplying energy at said frequency to said first mentioned material.

3. The combination as claimed in claim 1 and further including means for supplying energy at said frequency to said first and second mentioned materials.

4. The combination as claimed in claim 1 wherein said first and second mentioned materials are particles contained within a common host material.

5. In combination (a) a cavity resonant at a given frequency, (b) a material positioned within said cavity for absorbing energy at said frequency, (c) a material positioned within said cavity for emitting energy at said frequency; means for establishing a population inversion, corresponding to said frequency, in said second mentioned material for producing said emitted energy, the quantity of said second mentioned material in its excited state being such that the maximum population inversion, corresponding to said frequency, of said second mentioned material is greater than the population of the lower of the two states involved in absorption by said first mentioned material, (d) said materials being positioned such that energy sustained by said cavity passes through both materials and such that said first mentioned material can absorb energy emitted by said second mentioned material, and (e) the characteristics of said first and second mentioned materials being such that the product of the square of the induced electric dipole moment and the transverse relaxation time of said first mentioned material at said frequency is higher than that of said second mentioned material at said frequency.

6. The combination as claimed in claim 5 and further including means for supplying energy at said frequency to said first mentioned material.

7. The combination as claimed in claim 5 and further including means for supplying energy at said frequency to said first and second mentioned materials.

8. The combination as claimed in claim 5 wherein said first and second mentioned materials are particles contained within a common host material.

9. A light transmission device comprising, (a) a transmission line means for transmitting an optical signal, (b) a first material distributed along the length of said transmission line means for absorbing energy at the frequency of said optical signal, (c) a second material distributed along said transmission line means for emitting energy at the frequency of said optical signal, (d) means for establishing a population inversion, corresponding to said frequency, in said second mentioned material for producing said emitted energy, (e) the quantity of said second mentioned material in its excited state being such that the maximum population inversion, between energy states corresponding to said frequency, of said second mentioned material is greater than the population of the lower of the two states involved in absorption by said first mentioned material, and (f) the characteristics of said first and second mentioned materials being such that the strength of interaction between particles of said first mentioned material and said optical signal is greater than the strength of interaction between particles of said second mentioned material and said optical signal.

References Cited by the Examiner

UNITED STATES PATENTS

| 3,079,347 | 2/1963 | Garrett et al. | |
| 3,098,112 | 7/1963 | Horton | 88—61 |
| 3,150,313 | 9/1964 | Dehmelt. | |

OTHER REFERENCES

Gandy et al.: "Simultaneous Laser Action of Neodymium and Ytterbium Ions in Silicate Glass," IRE Proceedings, vol. 50, No. 10, pp. 2114–2115.

Gerritsen: "Recent Developments in Maser Devices and Materials," Applied Optics, vol. 1, No. 1, January 1962, pp. 37–44.

Gerritsen et al.: "Paramagnetic Resonance of $Ni^{2+}$ and $Ni^{3+}$ in $TiO_2$," Physical Review, vol. 125, No. 6, pp. 1853–1859 (March 15, 1962).

Geusic et al.: "A Unidirectional Traveling-Wave Optical Maser," Bell Systems Technical Journal, vol. 61, No. 7 (July 1962), pp. 1371 to 1397.

JEWELL H. PEDERSEN, *Primary Examiner.*

L. ORLOFF, R. L. WIBERT, *Assistant Examiners.*